United States Patent
Masuda (10) Patent No.: US 9,393,882 B2
(45) Date of Patent: Jul. 19, 2016

(54) CONVEYANCE SEAT

(71) Applicants: TOYOTA BOSHOKU KABUSHIKI KAISHA, Aichi-ken (JP); AISIN SEIKI KABUSHIKI KAISHA, Aichi-ken (JP); SHIROKI CORPORATION, Kanagawa-ken (JP)

(72) Inventor: Hideo Masuda, Aichi-ken (JP)

(73) Assignees: TOYOTA BOSHOKU KABUSHIKI KAISHA, Aichi-ken; AISIN SEIKI KABUSHIKI KAISHA, Aichi-ken (JP); SHIROKI CORPORATION, Kanagawa-ken (JP)

( * ) Notice: Subject to any disclaimer, the term of this patent is extended or adjusted under 35 U.S.C. 154(b) by 0 days.

(21) Appl. No.: 14/306,587

(22) Filed: Jun. 17, 2014

(65) Prior Publication Data

US 2014/0374562 A1 Dec. 25, 2014

(30) Foreign Application Priority Data

Jun. 20, 2013 (JP) .................................. 2013-129299

(51) Int. Cl.
*B60N 2/07* (2006.01)

(52) U.S. Cl.
CPC .............. *B60N 2/0705* (2013.01); *B60N 2/073* (2013.01); *B60N 2/0715* (2013.01)

(58) Field of Classification Search
CPC ...... B60N 2/07; B60N 2/0705; B60N 2/0715; B60N 2/073
USPC ........ 248/429, 424, 430; 296/65.13; 297/341, 297/344.1
See application file for complete search history.

(56) References Cited

U.S. PATENT DOCUMENTS

| | | | | |
|---|---|---|---|---|
| 4,355,778 A | * | 10/1982 | Hess et al. ..................... | 248/429 |
| 5,137,244 A | * | 8/1992 | Negi .............................. | 248/430 |
| 5,676,341 A | * | 10/1997 | Tarusawa et al. ............. | 248/430 |
| 5,826,936 A | * | 10/1998 | Scordato et al. ........... | 297/216.1 |
| 6,427,962 B1 | * | 8/2002 | Rohee et al. .................... | 248/424 |
| 6,676,099 B2 | * | 1/2004 | Mallard et al. ................ | 248/429 |
| 2002/0008183 A1 | | 1/2002 | Mallard et al. | |
| 2005/0057065 A1 | * | 3/2005 | Endoh et al. ................ | 296/65.13 |
| 2014/0374561 A1 | * | 12/2014 | Masuda ........................ | 248/429 |

FOREIGN PATENT DOCUMENTS

| | | |
|---|---|---|
| CN | 103029600 A | 4/2013 |
| EP | 0421300 A2 | 4/1991 |
| EP | 0901934 A1 | 3/1999 |
| JP | 3-53330 | 5/1991 |
| JP | 2004-203150 A | 7/2004 |

OTHER PUBLICATIONS

Chinese Office Action in counterpart Application No. CN201410279683.9, dated Dec. 29, 2015 (with partial English-language translation).

* cited by examiner

*Primary Examiner* — Anita M King
(74) *Attorney, Agent, or Firm* — Greenblum & Bernstein, P.L.C.

(57) ABSTRACT

A conveyance seat includes a lower rail, an upper rail, and a reinforcing member disposed on the lower rails to inhibit deformation of the lower rail. The reinforcing member is disposed in a rear end portion of the lower rail and extended rearwardly from the rear end portion of the lower rail, an upper surface pressing portion of the reinforcing member is disposed forwardly from the rear end portion of the lower rail, and a bent portion of the reinforcing member is disposed rearwardly from the rear end portion of the lower rail and adjacent to a tip portion of the lower rail.

5 Claims, 5 Drawing Sheets

CONVEYANCE SEAT

INCORPORATION BY REFERENCE

The disclosure of Japanese Patent Application No. 2013-129299 filed on Jun. 20, 2013 including the specification, drawings and abstract is incorporated herein by reference in its entirety.

BACKGROUND OF THE INVENTION

1. Field of the Invention

The invention relates to a conveyance seat.

2. Description of Related Art

In Japanese Utility Model Application Publication No. 03-53330 (JP 03-53330 U), there is disclosed a conveyance seat having lower rails disposed on the side of a vehicle constituting member such as a floor surface of the vehicle, upper rails disposed on the side of a seat main body and slidably and movably supported by the lower rails, and a reinforcing member is disposed in one of the lower rails to inhibit deformation of the lower rail.

The conveyance seat in JP 03-53330 U has the seat main body having a seat cushion and a seat back. Sliding rails have the lower rails and the upper rails. The lower rails are disposed on a vehicle constituting member such as the floor surface of the vehicle. The upper rails are disposed on the side of the seat main body and slidably and movably supported by the lower rails. The reinforcing member is integrally disposed in the vicinity of a seat belt buckle in the lower rail.

SUMMARY OF THE INVENTION

However, a region where a lower rail and an upper rail are easily deformed due to an impact load received by a sliding rail is a region of a rear end portion of the lower rail. Therefore, in the above technology in JP 03-53330 U, further investigation is required for a region where a reinforcing member is disposed, because there is the possibility that the lower rail and the upper rail peel off in the region of the rear end portion of the lower rail. Furthermore, the reinforcing member in the above technology of JP 03-53330 U has a structure to inhibit the deformation of the lower rail, but in the structure, the deformation of an only upper surface of the lower rail is inhibited. Therefore, it is considered that it is not possible to inhibit the peeling of the lower rail from the upper rail due to the deformation of another region of the lower rail depending on a type of impact load received by the sliding rail.

According to the present invention, there is provided a conveyance seat in which a reinforcing member to inhibit deformation of a lower rail and an upper rail due to an impact load is disposed at a more suitable position and in which it is possible to inhibit deformation of an upper surface of the lower rail while inhibiting deformation of another region of the lower rail.

According to an aspect of the present invention, there is provided a conveyance seat described in the following. The conveyance seat according to the aspect of the present invention includes a lower rail disposed on a vehicle constituting member; an upper rail disposed on the side of a seat main body and slidably and movably supported by the lower rail; and a reinforcing member disposed on the lower rail to inhibit deformation of the lower rail. The lower rail has a lower surface portion having a flat plate shape substantially parallel to the vehicle constituting member, side surface portions having a flat plate shape and rising from both ends of the lower surface portion, upper surface portions having a flat plate shape and returned inwardly from upper ends of both the side surface portions, and tip portions having a flat plate shape and suspended from inner end portions of both the upper surface portions. The reinforcing member integrally has a rising portion rising along the side surface portion of the lower rail, an upper surface pressing portion returned inwardly from an upper end of the rising portion to cover the upper surface portion of the lower rail from the upside, and a bent portion suspended from an inner end portion of the upper surface pressing portion. The reinforcing member is disposed in a rear end portion of the lower rail and extended rearwardly from the rear end portion of the lower rail, the upper surface pressing portion is disposed forwardly from the rear end portion of the lower rail, and the bent portion is disposed rearwardly from the rear end portion of the lower rail and adjacent to the tip portion of the lower rail.

According to the above aspect, the reinforcing member is disposed in the rear end portion of the lower rail. That is, the reinforcing member is disposed in a region where the lower rail and the upper rail are easily deformed. In consequence, it is possible to dispose, at a more suitable position, the reinforcing member which inhibits the deformation of the lower rail and the upper rail due to an impact load. Furthermore, the upper surface pressing portion of the reinforcing member covers the upper surface portion of the lower rail from the upside, to inhibit deformation of the upper surface portion. Furthermore, the bent portion of the reinforcing member is suspended from the inner end portion of the upper surface pressing portion, and disposed adjacent to the tip portion of the lower rail. That is, the bent portion is constituted to be engageable with the upper rail in a region where the tip portion of the lower rail is not disposed. In consequence, it is possible to obtain a constitution where the deformation of the upper surface portion of the lower rail is inhibited while inhibiting the deformation of the tip portion of the lower rail which is a region other than the upper surface portion. From the above, it is possible to dispose, at the more suitable position, the reinforcing member which inhibits the deformation of the lower rail and the upper rail due to the impact load, and it is also possible to inhibit the deformation of the upper surface of the lower rail while inhibiting deformation of another region of the lower rail.

In the above aspect, the reinforcing member may have a bottom surface portion which is interposed between the lower surface portion and the vehicle constituting member and formed integrally with the rising portion, and in the bottom surface portion, there may be formed a hole portion into which a fixing portion to fix both of the lower rail and the reinforcing member to the vehicle constituting member is inserted, and the hole portion may be formed at a position shifted from the upper surface pressing portion and the bent portion in a longitudinal direction of the lower rail with the reinforcing member being fixed together with the lower rail.

According to the above constitution, in the bottom surface portion, there is formed the hole portion into which the fixing portion to fix both of the lower rail and the reinforcing member to the vehicle constituting member is inserted. In consequence, it is possible to fix the lower rail and the reinforcing member together. Furthermore, the hole portion is formed at the position shifted from the upper surface pressing portion and the bent portion in the longitudinal direction of the lower rail with the reinforcing member being fixed together with the lower rail. Specifically, to fix the reinforcing member and the lower rail by the fixing portion, a fixing operation is not easily performed when the upper surface pressing portion and the bent portion are disposed in the vicinity of the hole portion, but the fixing operation is easily performed when the position where the hole portion is disposed is shifted from the upper surface pressing portion and the bent portion. Furthermore, the bottom surface portion is interposed between the lower rail and the vehicle constituting member, which enables the bottom surface portion to perform a function of a spacer. From the above, it is possible to enhance attaching operation properties of the lower rail and the reinforcing member.

Furthermore, in the above aspect, the conveyance seat may have plurality sets of the lower rail and the upper rail, and the reinforcing member may be disposed in one lower rail on a side where a buckle attaching bracket to be attached to a seat belt buckle to be disposed in the seat main body is disposed.

According to the above constitution, a region where a stress due to the impact load is concentrated on the sliding rail is remarkably seen in the one lower rail on the side where the buckle attaching bracket is disposed. The reinforcing member is disposed on the side where the buckle attaching bracket is disposed, so that it is possible to inhibit the deformation of the lower rail on which the stress due to the impact load is concentrated.

Furthermore, in the above constitution, the rising portion of the reinforcing member may only be disposed in the side surface portion of the one lower rail on a side opposite to a side of the other lower rail where the buckle attaching bracket is not disposed, in both the side surface portions of the one lower rail.

According to the above constitution, the region where the stress due to the impact load is concentrated on the sliding rail is remarkably seen in the one lower rail on the side where the buckle attaching bracket is disposed. Therefore, the reinforcing member is disposed in the one lower rail on the side where the buckle attaching bracket is disposed. Furthermore, in both the side surface portions of the one lower rail, the side surface portion thereof on the side opposite to the side of the other lower rail where the buckle attaching bracket is not disposed is easily deformed. Therefore, the rising portion of the reinforcing member is only disposed in such a region. From the above, the reinforcing member can be disposed at the more suitable position while suppressing a weight of the reinforcing member.

Furthermore, in the above aspect, a length of the bent portion in a suspended direction may be smaller than a length of the tip portion in the suspended direction.

According to the above constitution, it is possible to prevent interference with the upper rail in a usual state of the sliding rail.

The aspect of the present invention has the above constitution, so that it is possible to dispose, at the more suitable position, the reinforcing member which inhibits the deformation of the lower rail and the upper rail due to the impact load, and it is also possible to inhibit the deformation of the upper surface of the lower rail while inhibiting the deformation of the other region of the lower rail.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the present invention will be described with reference to FIGS. 1 to 6. It is to be noted that in the present embodiment, a front seat of vehicle seats will be described as an example of a conveyance seat. Directions suitably shown by arrows in the respective drawings match forward, rearward, upward, downward, outward and inward directions of the car to which the vehicle seat is applied, respectively. It is to be noted that in the respective drawings, for explaining a constitution of the embodiment so that the constitution is easily understood, an inner structure of a seat main body is mainly shown. Therefore, as to a seat main body 1, an inner frame structure of a frame or the like constituting a framework is mainly shown, and accessories such as outwardly equipped outer cover and seat pad are omitted.

Figure 1:
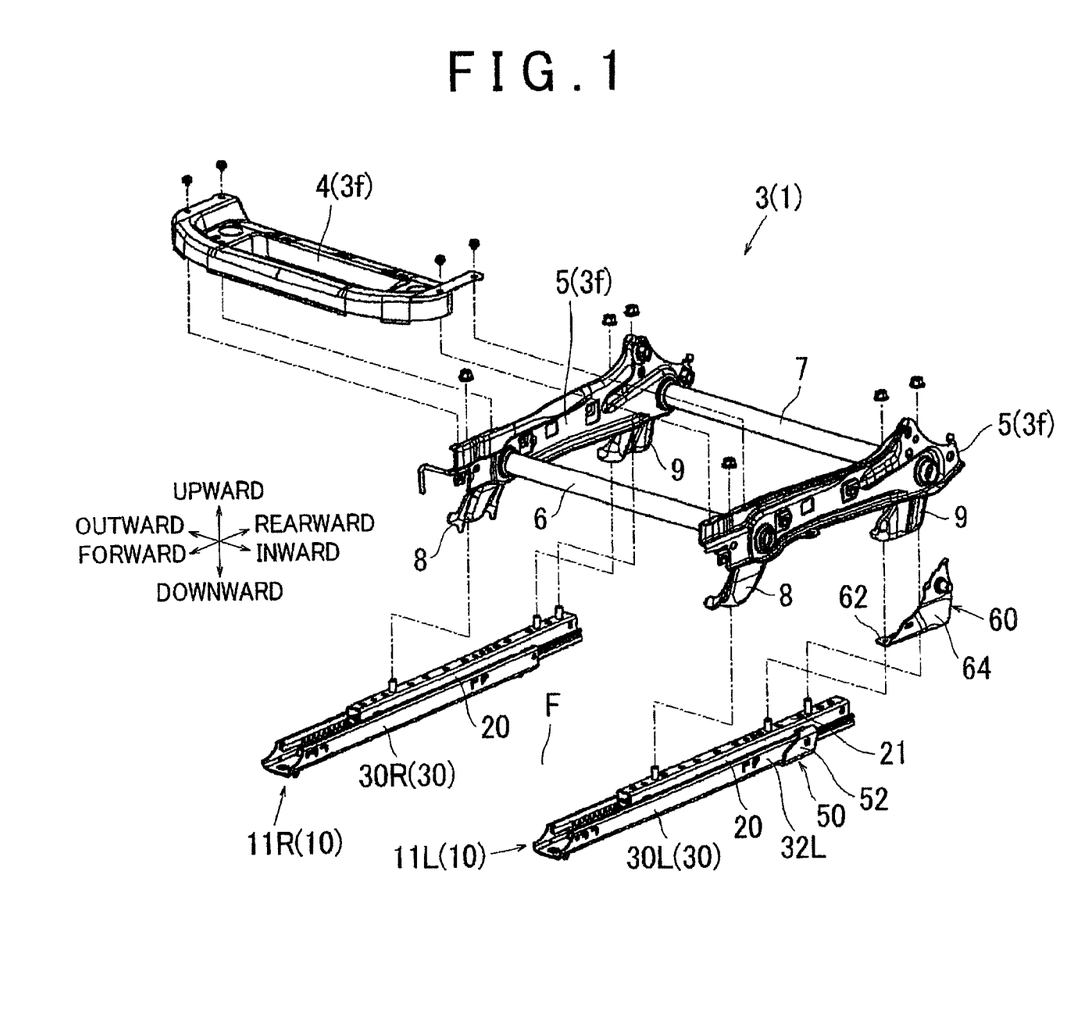
FIG. 1 is an exploded perspective view of a vehicle seat according to an embodiment.

The vehicle seat (the conveyance seat) has the seat main body 1 mainly constituted of a seat back (not shown) which is a backrest section and a seat cushion 3 which is a seating section as shown in FIG. 1. The seat back has a back frame constituting a framework. The back frame is substantially formed into a rectangular frame shape by suitably subjecting a pipe member or a plate member made of an iron steel material to bend processing, draw processing or the like. The seat cushion 3 has a cushion frame 3f constituting the framework. The cushion frame 3f is substantially formed into a rectangular frame shape by suitably subjecting a pipe member or a plate member made of an iron steel material to bend processing, draw processing or the like. The seat main body 1 is coupled to the cushion frame 3f by a reclining device (not shown) disposed in a lower portion of the back frame in a width direction. In consequence, in the seat back, a backrest angle to the seat cushion 3 is regulated, and the seat back is constituted to be tiltable forward to the seat cushion 3.

As shown in FIG. 1, the cushion frame 3f is mainly constituted of a front frame 4, lower arms 5, 5, a front rod 6, and a rear rod 7, and substantially formed into the rectangular frame shape. Furthermore, under the substantially rectangular frame-like member, front leg portions 8, 8 and rear leg portions 9, 9 to be coupled to an after-mentioned sliding rail apparatus are disposed. Each of the lower arms 5, 5 is formed by suitably bending a plate member having a long belt shape. The lower arms 5, 5 are longitudinally disposed along a forward-backward direction on both sides of the cushion frame 3f in the width direction above an after-mentioned sliding rail apparatus 10. At front ends of the lower arms 5, 5, the front frame 4 is extended across these front ends to constitute a front end of the cushion frame 3f. In front portions of the lower arms 5, 5, the front rod 6 made of the pipe member of the iron steel material pass through the lower arms 5, 5 in the width direction and extended across the front portions. Similarly, in rear portions of the lower arms 5, 5, the rear rod 7 made of the pipe member of the iron steel material pass through the lower arms 5, 5 in the width direction and extended across the rear portions. The cushion frame 3f is slidably supported by the sliding rail apparatus 10.

As shown in FIG. 1, the vehicle seat has the sliding rail apparatus 10 which is interposed between the seat main body 1 described above and a floor surface F (a vehicle constituting member) of the car so that a sitting position in the forward-backward direction to the floor surface F of the seat main body 1 is regulatable. The sliding rail apparatus 10 has sliding rails 11R, 11L, a reinforcing member 50, and a slide locking device (not shown). The sliding rails 11R, 11L are disposed along the forward-backward direction between the seat cushion 3 and the floor surface F of the car and disposed as a pair of right and left sliding rails parallel to each other. Here, in the sliding rail apparatus 10, the sliding rail 11R is disposed on an outer side, and the sliding rail 11L is disposed on an inner side.

As shown in FIG. 1, the sliding rails 11R, 11L are interposed between the seat main body 1 and the floor surface F of the car, and have a mechanism which moves the sitting position of the seat main body 1 to the floor surface F in the forward-backward direction. Each of the sliding rails 11R, 11L is mainly constituted of a lower rail 30, an upper rail 20, rollers 40 and 42 (see FIGS. 4 and 5), and a guide (not shown). The lower rail 30 is formed into a shape extending in the forward-backward direction, and disposed on the floor surface F. The upper rails 20 are disposed on the side of the seat main body 1, and are fitted into the lower rails 30, respectively, so that the upper rails are slidably and movable to the lower rails 30 in a rail longitudinal direction. Specifically, the lower rail 30 is superimposed on the upper rail 20 via the rollers 40 and 42 and the guide to form a tubular shape. In consequence, the upper rails 20 are slidably and movably guided in the forward-backward direction to the lower rails 30 to move the sitting position of the seat main body 1 in the forward-backward direction. Furthermore, in the sliding rail apparatus 10, the slide locking device (not shown) is constituted to regulate and release the sliding movement of the upper rails 20, so that the seat main body 1 can be fixed to a suitable position in the forward-backward direction.

Figure 4:
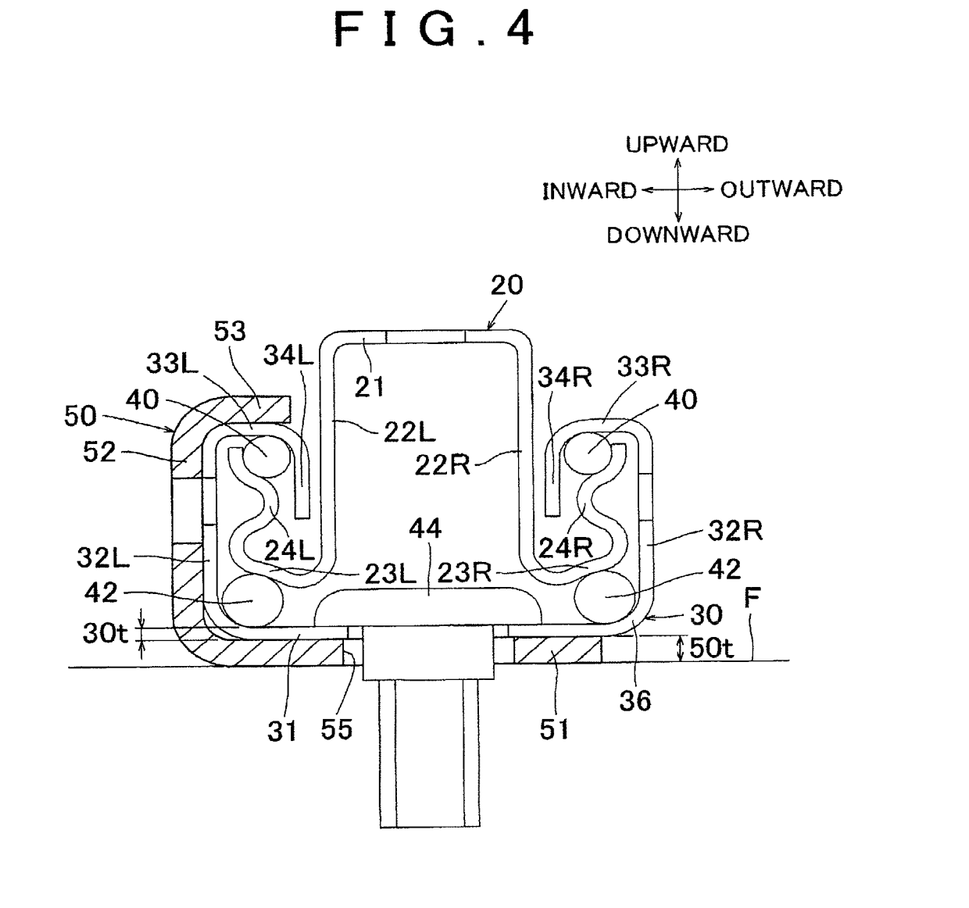
FIG. 4 is a sectional view cut along the IV-IV line of FIG. 3.

As shown in FIG. 1, each of the lower rails 30 is formed into a shape extending in the forward-backward direction, and disposed on the floor surface F. As shown in FIG. 4, the lower rail 30 is integrally formed into the following transverse sectional shape by bending one flat plate-like member made of an iron steel material at portions. Specifically, the lower rail has a lower surface portion 31 having a flat plate shape and facing the floor surface F from the upside. The lower surface portion 31 has a right side surface portion 32R and a left side surface portion 32L having a flat plate shape and rising from both ends of the lower surface portion 31. The right side surface portion 32R and the left side surface portion 32L have a right upper surface portion 33R and a left upper surface portion 33L having a flat plate shape and returned inwardly from upper ends of the side surface portions, respectively. The right upper surface portion 33R and the left upper surface portion 33L have a right tip portion 34R and a left tip portion 34L having a flat plat shape and suspended from inner end portions of the upper surface portions, respectively. It is to be noted that the right side surface portion 32R and the left side surface portion 32L are examples of "side surface portions of a lower rail" of the present invention, respectively. The right upper surface portion 33R and the left upper surface portion 33L are examples of "upper surface portions of the lower rail" of the present invention, respectively. The right tip portion 34R and the left tip portion 34L are examples of "tip portions of the lower rail" of the present invention, respectively.

Figure 2:
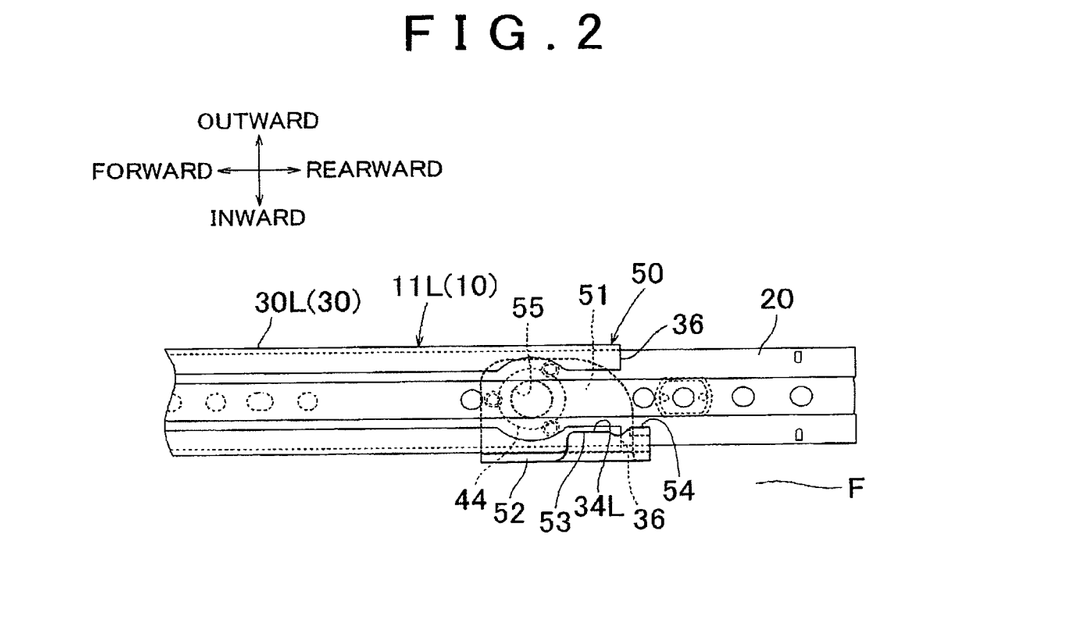
FIG. 2 is a partial plan view of a sliding rail of the vehicle seat according to the embodiment.
Figure 3:
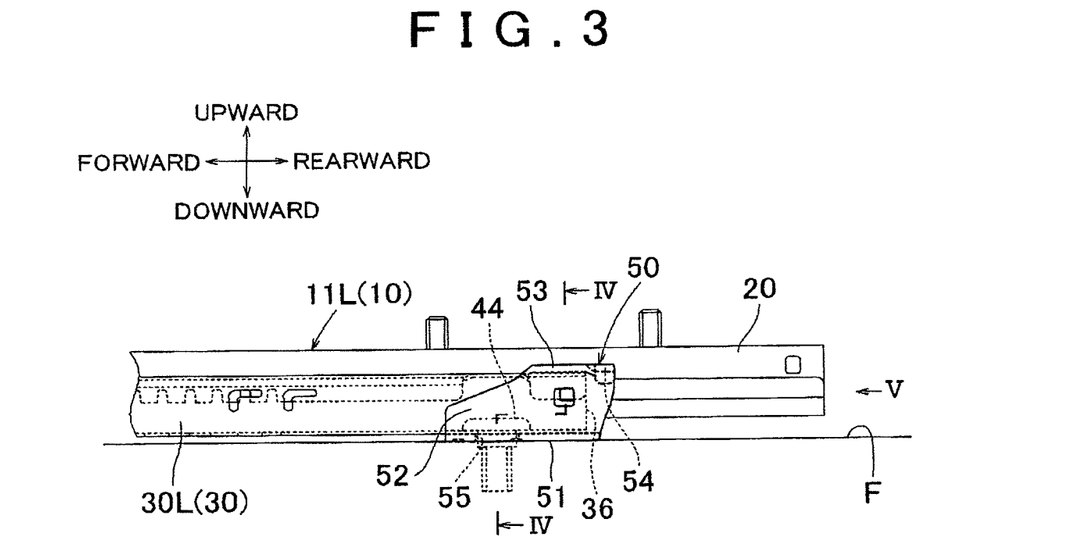
FIG. 3 is a partial side view of the sliding rail of the vehicle seat according to the embodiment.

As shown in FIGS. 1 to 3, the upper rails 20 are disposed on the side of the seat main body 1, and fitted into the lower rails 30, respectively, so that the upper rails are slidable and movable to the lower rails in the rail longitudinal direction. As shown in FIG. 4, each of the upper rails 20 is integrally formed into the following transverse sectional shape by bending one flat plate-like member made of an iron steel material at portions. Specifically, the upper rail has an upper surface portion 21 having a flat plate shape substantially parallel to the floor surface F. The upper surface portion 21 has a right side surface portion 22R and a left side surface portion 22L which have a flat plate shape, and are suspended from both ends of the upper surface portion 21. The right side surface portion 22R and the left side surface portion 22L have a right returned surface portion 23R and a left returned surface portion 23L which are returned outwardly from lower ends of the side surface portions in a curved shape, respectively. The right returned surface portion 23R and the left returned surface portion 23L have a right tip portion 24R and a left tip portion 24L which rise from outer end portions of the returned surface portions in a bent shape, respectively.

Figure 5:
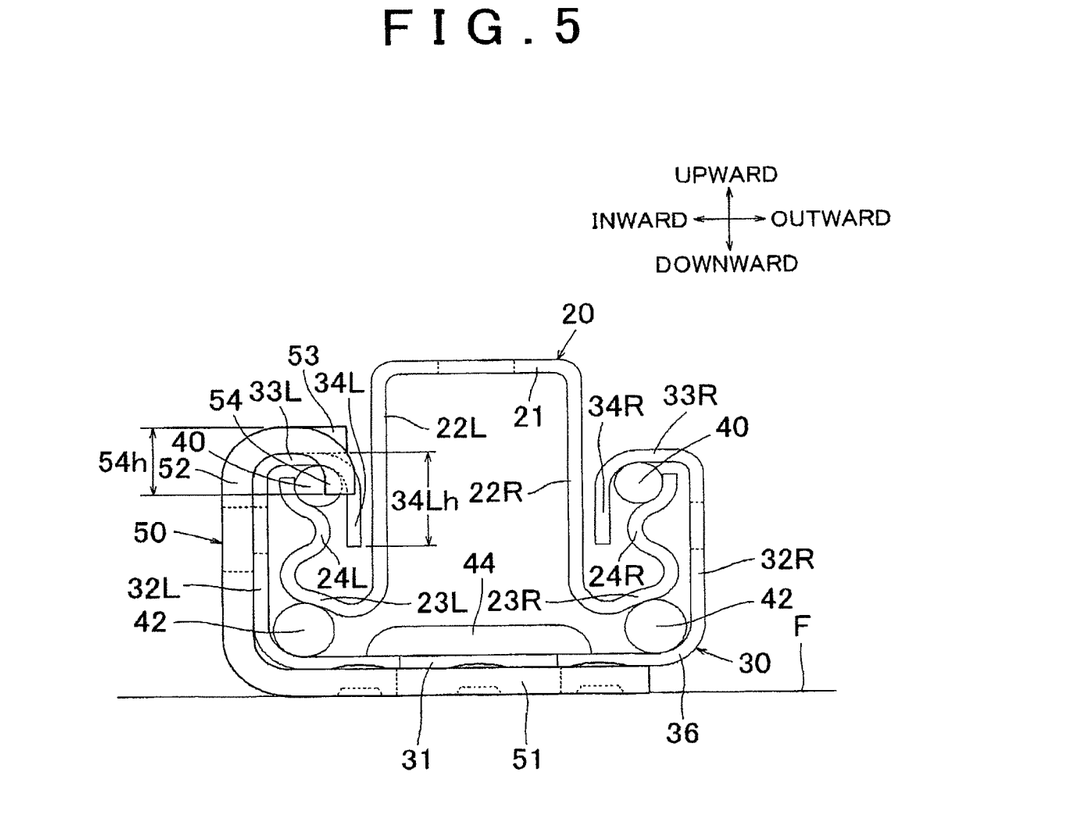
FIG. 5 is a view from a direction of an arrow V of FIG. 3.
Figure 6:
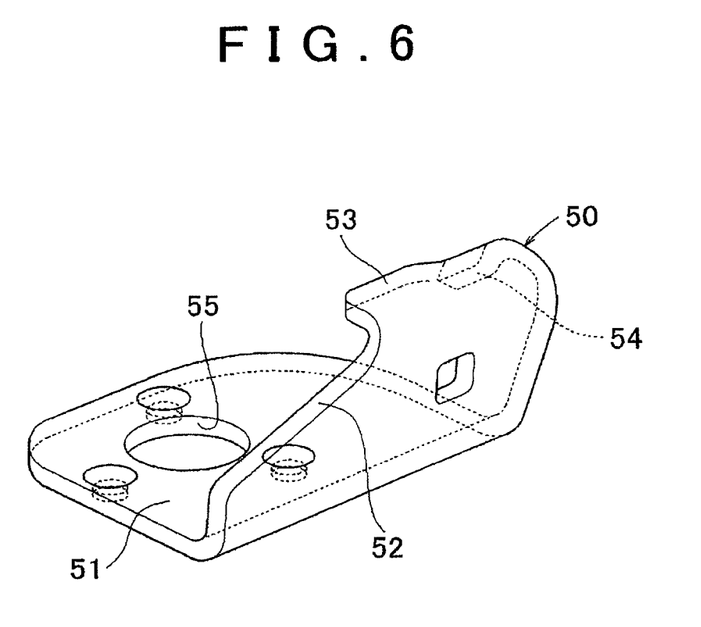
FIG. 6 is a perspective view of a reinforcing member disposed in the sliding rail of the vehicle seat according to the embodiment.

As shown in FIGS. 4 to 6, the reinforcing member 50 is substantially formed into a sectional L-shape by bending one flat plate-like member made of an iron steel material at portions. A thickness 50$t$ of the reinforcing member 50 is set to be larger than a thickness 30$t$ of the lower rail 30 in view of a strength. The reinforcing member 50 has such a constitution as seen in a forward direction from a rear end portion 36 of the lower rail 30 as follows. In the reinforcing member 50, a bottom surface portion 51 is interposed between the lower surface portion 31 of the lower rail 30 and the floor surface F (the vehicle constituting member). From the bottom surface portion 51, there is integrally extended a rising portion 52 extending from a left end portion of the bottom surface portion along the left side surface portion 32L of the lower rail 30. From the rising portion 52, there is extended an upper surface pressing portion 53 which is returned inwardly from an upper end of the rising portion to cover the left upper surface portion 33L of the lower rail 30 from the upside. From the upper surface pressing portion 53, a bent portion 54 suspended from an inner end portion of the upper surface pressing portion 53 is extended.

As shown in FIGS. 2, 3 and 5, the reinforcing member 50 is disposed in the rear end portion 36 of the lower rail 30. Furthermore, the rising portion 52 of the reinforcing member 50 extends rearwardly from the rear end portion 36 of the lower rail 30. Here, the upper surface pressing portion 53 is disposed forwardly from the rear end portion 36 of the lower rail 30. The bent portion 54 is disposed rearwardly from the rear end portion 36 of the lower rail 30. In consequence, the bent portion 54 is adjacent to the rear of the left tip portion 34L of the lower rail 30. Here, as shown in FIG. 5, a length 54$h$ of the bent portion 54 is set to be smaller than a length 34L$h$ of the left tip portion 34L of the lower rail 30. This setting is for the purpose of preventing interference of a sliding rail 11 with the upper rail 20 in a usual state of the sliding rail.

In the bottom surface portion 51, there is formed a hole portion 55 into which a fixing portion 44 to fix both of the lower rail 30 and the reinforcing member 50 to the floor surface F is inserted. To the fixing portion 44, any portion can be applied, but in the present embodiment, fasten fixing by bolts and nuts is employed. In consequence, both of the lower rail 30 and the reinforcing member 50 are fastened by the fasten fixing by the fixing portion 44. The hole portion 55 is formed at a position shifted from the upper surface pressing portion 53 and the bent portion 54 in the longitudinal direction of the lower rail 30 with the reinforcing member 50 being fixed together with the lower rail 30.

Furthermore, as shown in FIG. 1, the reinforcing member 50 is disposed in a lower rail 30L in the sliding rail 11L on the side where a buckle attaching bracket 60 to be attached to a seat belt buckle to be disposed in the seat main body 1 is disposed. The buckle attaching bracket 60 is substantially formed into a sectional L-shape by bending one flat plate-like member made of an iron steel material at portions. The buckle attaching bracket 60 has a fixing surface 62 which faces the upper surface portion 21 of the upper rail 20, and an attaching surface 64 to be attached to the buckle, which is extended upwardly from an end portion of this fixing surface and substantially in parallel to an outer side of the lower rail 30L. The buckle attaching bracket 60 is fastened and fixed with the balls and nuts by interposing the fixing surface 62 between the upper surface portion 21 of the upper rail 20 of the sliding rail 11L on an inner side and the rear leg portion 9. Here, the lower rail 30L in the sliding rail 11L on the side (the inner side of FIG. 1) where the buckle attaching bracket 60 is disposed as shown in FIG. 1 is an example of "one lower rail" in the present invention. Furthermore, a lower rail 30R (on the outer side of FIG. 1) in the sliding rail 11R in which the buckle attaching bracket 60 is not disposed as shown in FIG. 1 is an example of "the other lower rail" in the present invention. Here, the rising portion 52 of the reinforcing member 50 is only disposed in the left side surface portion 32L on a side opposite to the side of the other lower rail 30R where the buckle attaching bracket 60 is not disposed, in the right side surface portion 32R and the left side surface portion 32L of the one lower rail 30L. In other words, the rising portion is only disposed on the outer side surface portion in the width direction to the seat main body 1, in the right side surface portion 32R and the left side surface portion 32L of the one lower rail 30L.

As described above, according to the vehicle seat of the embodiment, the reinforcing member 50 is disposed in the rear end portion 36 of the lower rail 30. That is, the reinforcing member 50 is disposed in a region where the lower rail 30 and the upper rail 20 are easily deformed. In consequence, it is possible to dispose, at a more suitable position, the reinforcing member 50 which inhibits the deformation of the lower rail 30 and the upper rail 20 due to an impact load. Furthermore, the upper surface pressing portion 53 of the reinforcing member 50 covers the left upper surface portion 33L of the lower rail 30 from the upside, thereby inhibiting the deformation of the left upper surface portion 33L. Furthermore, the bent portion 54 of the reinforcing member 50 is suspended from the inner end portion of the upper surface pressing portion 53, and disposed adjacent to the left tip portion 34L of the lower rail 30. That is, the bent portion 54 is constituted to be engageable with the upper rail 20 in a region where the left tip portion 34L of the lower rail 30 is not disposed. Thus, it is possible to obtain a constitution where the deformation of the left tip portion 34L of the lower rail 30 which is a region other than the left upper surface portion 33L is inhibited while inhibiting the deformation of the left upper surface portion 33L of the lower rail 30. From the above, it is possible to dispose, at the more suitable position, the reinforcing member 50 which inhibits the deformation of the lower rail 30 and the upper rail 20 due to the impact load. Furthermore, it is possible to inhibit the deformation of the upper surface of the lower rail 30 while inhibiting the deformation of the left tip portion 34L which is the other region of the lower rail 30.

Furthermore, in the bottom surface portion 51, there is formed the hole portion 55 into which the fixing portion 44 to fix both of the lower rail 30 and the reinforcing member 50 to the floor surface F (the vehicle constituting member) of the car is inserted. In consequence, it is possible to fix the lower rail 30 and the reinforcing member 50 together. Furthermore, the hole portion 55 is formed at the position shifted from the upper surface pressing portion 53 and the bent portion 54 in the longitudinal direction of the lower rail 30 with the reinforcing member 50 being fixed together with the lower rail 30. Therefore, to fix the reinforcing member 50 and the lower rail 30 by the fixing portion 44, a fixing operation is not easily performed when the upper surface pressing portion 53 and the bent portion 54 are disposed in the vicinity of the hole portion 55, but the fixing operation is easily performed when the position where the hole portion 55 is disposed is shifted from the upper surface pressing portion 53 and the bent portion 54. Furthermore, the bottom surface portion 51 is interposed between the lower rail 30 and the floor surface F of the car, which also enables the bottom surface portion to perform a function of a spacer. From the above, it is possible to enhance attaching operation properties of the lower rail 30 and the reinforcing member 50.

Furthermore, a region where a stress due to the impact load is concentrated on the sliding rail is remarkably seen in the one lower rail 30 on the side where the buckle attaching bracket 60 is disposed. Therefore, the reinforcing member 50 is disposed in the one lower rail 30 on the side where the buckle attaching bracket 60 is disposed. Furthermore, in the right side surface portion 32R and the left side surface portion 32L of the one lower rail 30, the left side surface portion 32L opposite to the side of the other lower rail 30 in which the buckle attaching bracket 60 is not disposed is easily deformed. Therefore, the rising portion of the reinforcing member 50 is only disposed in the left side surface portion 32L. From the above, it is possible to dispose the reinforcing member 50 at the more suitable position while suppressing a weight of the reinforcing member.

The embodiment of the present invention has been described above, but the conveyance seat of the present invention is not limited to the embodiment, and can be implemented in various other configurations. For example, it has been described that the rising portion, the upper surface pressing portion and the bent portion in the reinforcing member are disposed on one side of the lower rail, but may be disposed on both sides of the lower rails. Furthermore, the reinforcing member may be disposed on the side of the sliding rail in which the seat belt buckle is not disposed.

What is claimed is:

1. A conveyance seat comprising:
   a lower rail disposed on a vehicle constituting member;
   an upper rail disposed on the side of a seat main body and slidably and movably supported by the lower rail; and
   a reinforcing member disposed on the lower rail to inhibit deformation of the lower rail,
   wherein the lower rail has a lower surface portion having a flat plate shape substantially parallel to the vehicle constituting member, side surface portions having a flat plate shape and rising from both ends of the lower surface portion, upper surface portions having a flat plate shape and returned inwardly from upper ends of both the side surface portions, and tip portions having a flat plate shape and suspended from inner end portions of both the upper surface portions,
   the reinforcing member integrally has a rising portion rising along the side surface portion of the lower rail, an upper surface pressing portion returned inwardly from an upper end of the rising portion to cover the upper surface portion of the lower rail from the upside, and a bent portion suspended from an inner end portion of the upper surface pressing portion, and
   the reinforcing member is disposed in a rear end portion of the lower rail and extended rearwardly from the rear end portion of the lower rail, the upper surface pressing portion is disposed forwardly from the rear end portion of the lower rail, and the bent portion is disposed rearwardly from the rear end portion of the lower rail and adjacent to the tip portion of the lower rail.

2. The conveyance seat according to claim 1, wherein the reinforcing member has a bottom surface portion which is interposed between the lower surface portion and the vehicle constituting member and formed integrally with the rising portion, the bottom surface portion has a hole portion into which a fixing portion to fix both of the lower rail and the reinforcing member to the vehicle constituting member is inserted, and the hole portion is formed at a position shifted from the upper surface pressing portion and the bent portion in a longitudinal direction of the lower rail with the reinforcing member being fixed together with the lower rail.

3. The conveyance seat according to claim 1, wherein the conveyance seat has at least one set of the lower rail and the upper rail, and the reinforcing member is disposed in one lower rail on a side where a buckle attaching bracket to be attached to a seat belt buckle to be disposed in the seat main body is disposed.

4. The conveyance seat according to claim 3, wherein the rising portion of the reinforcing member is only disposed in the side surface portion of the lower rail on a side opposite to a side of the other lower rail where the buckle attaching bracket is not disposed, in both the side surface portions of the one lower rail.

5. The conveyance seat according to claim 1, wherein a length of the bent portion in a suspended direction is smaller than a length of the tip portion in the suspended direction.

* * * * *